(12) United States Patent
Kim

(10) Patent No.: US 10,004,252 B2
(45) Date of Patent: Jun. 26, 2018

(54) KELP CHIP MANUFACTURING METHOD

(71) Applicant: Chul-Woo Kim, Gwangju (KR)

(72) Inventor: Chul-Woo Kim, Gwangju (KR)

(73) Assignee: HYANG-A FOOD CO., LTD., Jeollanam-Do (KR)

( * ) Notice: Subject to any disclaimer, the term of this patent is extended or adjusted under 35 U.S.C. 154(b) by 249 days.

(21) Appl. No.: 14/922,984

(22) Filed: Oct. 26, 2015

(65) Prior Publication Data

US 2017/0112172 A1    Apr. 27, 2017

(51) Int. Cl.
| | | |
|---|---|---|
| *A23L 17/60* | (2016.01) | |
| *A23L 5/10* | (2016.01) | |
| *A23L 3/44* | (2006.01) | |

(52) U.S. Cl.
CPC ............. *A23L 17/60* (2016.08); *A23L 3/44* (2013.01); *A23L 5/11* (2016.08); *A23V 2002/00* (2013.01)

(58) Field of Classification Search
CPC ................................... A23L 3/44; A23L 17/60
See application file for complete search history.

(56) References Cited

U.S. PATENT DOCUMENTS

2014/0141138 A1* 5/2014 Gaus ................. A23L 1/217
                                                                  426/281

FOREIGN PATENT DOCUMENTS

CN    101156619 A  *  4/2008  ............. A23B 7/00
KR    100206342        4/1999

OTHER PUBLICATIONS

Machine translation of CN 101156619. Publication date Apr. 9, 2008. pp. 1-6. (Year: 2008).*
Machine translation of KR1997007919. Publication date Nov. 5, 1998. (Year: 1998).*
"Seasoned Seaweed". Available online as of Jul. 6, 2011 from maangchi.com. p. 1. (Year: 2011).*
"Retort Processing". Available online as of Jan. 3, 2014 from RetortProcessing.com. pp. 1-3. (Year: 2014).*

* cited by examiner

*Primary Examiner* — Jenna A Watts
(74) *Attorney, Agent, or Firm* — IPLA, P.A.; James E. Bame

(57) ABSTRACT

Provided is a kelp chip manufacturing method which does not require frying with no transformation of the shape of kelp but has high preference. The kelp chip manufacturing method includes: a kelp braizing process of braizing kelp using one of starch syrup, soy source, olive oil or mixture of starch syrup, soy source and olive oil; a kelp heating process of heating the braized kelp in a retort-pouched state; and a kelp freeze-drying process of freeze-drying the heated kelp. The kelp chip manufacturing method can manufacture kelp chips with high preference in texture, taste and so on through the kelp braizing process and the kelp heating process.

9 Claims, 3 Drawing Sheets

KELP CHIP MANUFACTURING METHOD

BACKGROUND

The present invention relates to a kelp chip manufacturing method which does not require frying with no transformation of the shape of kelp but has high preference.

Kelp is a treasure house of mineral which is rich in various minerals of more than 50 kinds, and nutrient food which is very useful for humans. Especially, kelp is rich in alginate fiber to control absorption of the nutrition inside the digestive organs and the intestines and to rapidly discharge waste matters, such as intestinal fat, cholesterol, excessive fat, heavy metal, cancer-causing agents or coprostasis, from the body.

However, in spite of such great nutritional characteristics of kelp, kelp has limit in promotion of consumption due to its inherent tissue and smell and storage problem, and studies on development of processed foods are insufficient.

In general, a seasoned and fried kelp flake is a representative processed food made with kelp. The seasoned and fried kelp flake is made through a natural deoiling method including the steps of: boiling cooking oil, which contains sugar to make a sweet taste, to 200 degrees in a fryer; putting kelp flakes in the boiling oil and frying the kelp flakes for two to three minutes; and filtering oil out using an oil filter after a suitable period of time.

However, the seasoned and fried kelp flake made through the conventional method is not chewy because it is thick and hard. Moreover, if a consumer eats the seasoned and fried kelp flake in error, the consumer may get wounded on the root of the mouth or gums, and doesn't feel refreshed due to its salty, bitter and stale taste after the sweet taste is gone.

Furthermore, the seasoned and fried kelp flake made through the conventional method has another disadvantage in that its commercial value is depreciated due to lots of oil smeared on the inner surface of a packing plastic bag when the seasoned and fried kelp flake is commercialized because the seasoned and fried kelp flake which is manufactured by the deoiling method using a simple gravitational action has too much oil residue.

Korean Patent No. 10-0206342 granted on Apr. 8, 1999 discloses a "Fried sea mustard manufacturing method" which becomes a background art of the present invention.

Therefore, the present invention provides a kelp chip manufacturing method with high preference for the purpose of utilizing superior nutritional seaweeds.

SUMMARY OF THE INVENTION

Accordingly, the present invention has been made to solve the above-mentioned problems occurring in the prior arts, and it is an object of the present invention to provide a kelp chip manufacturing method which does not require frying with no transformation of the shape of kelp but has high preference.

To accomplish the above object, according to the present invention, there is provided a kelp chip manufacturing method including: a kelp braising process of braising kelp using one of starch syrup, soy source, olive oil or mixture of starch syrup, soy source and olive oil; a kelp heating process of heating the braised kelp in a retort-pouched state; and a kelp freeze-drying process of freeze-drying the heated kelp.

Preferably, before the kelp braising process, the kelp chip manufacturing method further includes: a kelp preparing process of cutting and preparing kelp; a kelp steeping process of steeping the prepared kelp; a kelp steaming process of steaming the steeped kelp; and a kelp dehydrating process of dehydrating the steamed kelp.

Moreover, preferably, in the kelp braising process, based on 100 parts by weight of the dehydrated kelp, 1 to 30 parts by weight of starch syrup, 1 to 30 parts by weight of soy source and 1 to 30 parts by weight of oil are mixed together or 1 to 30 parts by weight of a mixed liquid of starch syrup, soy source and oil is added to the dehydrated kelp and braised.

Furthermore, preferably, in the kelp braising process, the pieces of kelp are braised at a temperature of 50 to 90° C. for 30 to 60 minutes.

Preferably, oil is at least one of olive oil, soybean oil, sunflower oil, safflower oil, canola oil, palm oil and sesame seed oil.

The kelp chip manufacturing method according to the present invention which does not fry kelp flakes and keeps the original shapes of the kelp flakes but enhances the shape and texture (crispiness), thereby providing excellent consumer preference.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, referring to the attached drawings, through preferred embodiments and comparative examples, composition and effects of the present invention will be described in detail as follows.

Manufacturing Example 1

Figure 1:
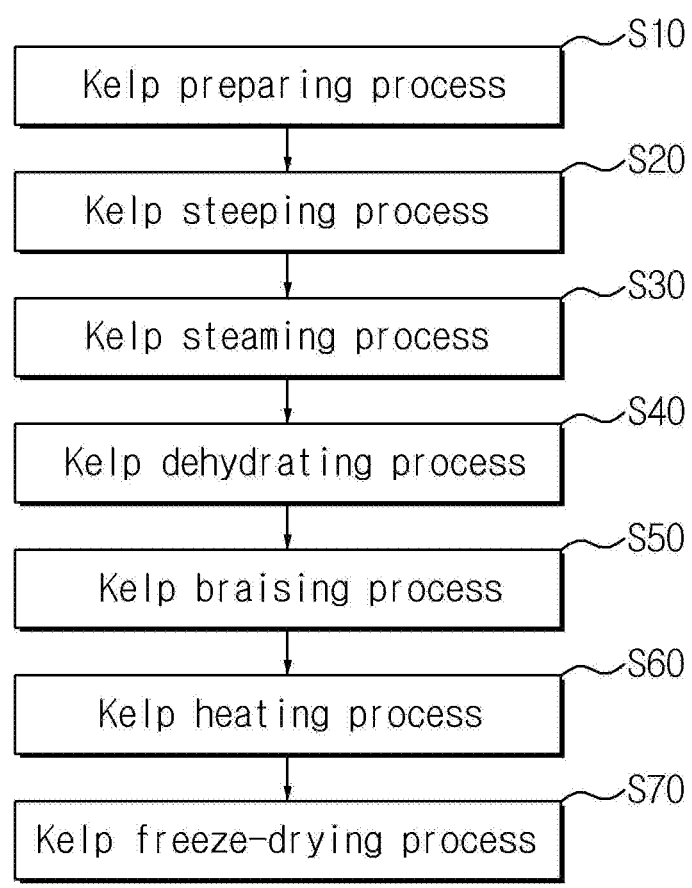
FIG. 1 is a flow chart showing a kelp chip manufacturing process according to a preferred embodiment of the present invention.

As shown in FIG. 1, a kelp chip manufacturing method according to the present invention includes a kelp preparing process (S10), a kelp steeping process (S20), a kelp steaming process (S30), a kelp dehydrating process (S40), a kelp braising process (S50), a kelp heating process (S60) and a kelp freeze-drying process (S70).

<Process 1: Kelp Preparing Process (Σ10)>

The kelp preparing process is to cut flake into kelp flakes. In this process, Select and cut kelp of good quality to a thickness of 2 cm to 3 cm.

<Process 2: Kelp Steeping Process (Σ20)>

In the kelp steeping process, steep the prepared kelp flakes in a container, which is filled with water, for 10 to 60 minutes. While the kelp flakes are steeped in the container, exchange water several times in order to remove a large quantity of salt, and finally rinse the kelp flakes cleanly.

<Process 3: Kelp Steaming Process (Σ30)>

The kelp steaming process is to release polysaccharide carbohydrate constituents, such as alginic acid, which are <Process 4: Kelp Dehydrating Process (Σ40)>

In the kelp dehydrating process, remove unnecessary moisture remaining on the steamed kelp, and then, Dehydrate the kelp flakes for 5 minutes in order to naturally release polysaccharide carbohydrate constituents, such as alginic acid, released through the steaming process.

<Process 5: Kelp Braising Process (Σ50)>

In the kelp braising process, based on 100 parts by weight of the dehydrated kelp, mix 1 to 30 parts by weight of starch syrup, 1 to 30 parts by weight of soy source and 1 to 30 parts by weight of oil together, or add 1 to 30 parts by weight of a mixed liquid of starch syrup, soy source and oil to the dehydrated kelp, and then, braise them. Preferably, the mixed ingredients are braised at a temperature of 30 to 100° C. for 10 to 120 minutes. In this instance, preferably, at least one of olive oil, soybean oil, sunflower oil, palm oil and sesame seed oil is used.

Through the kelp braising process, the constituents, such as alginic acid, together with moisture are released from the braised kelp flakes by the effect of osmotic pressure by soy source. Moreover, glycocomponent of starch syrup interpenetrates between the textures of the kelp flakes from which the constituents are released so as to fill empty spaces. That is, the glycocomponent which fills between the textures of the kelp flakes prevents that thickness of the kelp becomes thinner while the kelp flakes are dried. Additionally, olive oil considerably reduces the fishy taste of the kelp flakes. In other words, olive oil removes the fishy taste of kelp. In addition, the sweet taste of starch syrup and the salty taste of soy source are mixed in harmony while the kelp flakes are braised, so that the overall taste of the braised kelp flakes is enhanced and the olive oil coated on the kelp flakes adds a nutty taste.

<Process 6: Kelp Heating Process (Σ60)>

The kelp heating process is to heat the braised kelp flakes in a retort-pouched state. Put the kelp flakes of 1 kg in a retort pouch, and heat the retort-pouched kelp flakes at a temperature of 70 to 120° C. for 5 to 120 minutes. In the kelp heating process, because the kelp flakes are put, sealed and packed in the retort pouch, the external surface of the braised kelp flakes can be evenly well-done by indirect heat transferred to the inner space of the retort pouch without getting wet or polluted by moisture contained in steam.

<Process 7: Kelp Freeze-Drying Process (Σ70)>

In the kelp freeze-drying process, put the heated kelp flakes in a container not to be overlapped, and then, cool the kelp flakes at a temperature of −20 to −45° C. till frost is formed on the surface of the kelp. Preferably, freeze-drying is carried out for 5 to 120 minutes.

Therefore, through the above-mentioned process, the present invention can manufacture kelp chips with excellent taste and texture and high preference, which are not fried and keep the original shape.

Manufacturing Example 2

Figure 2:
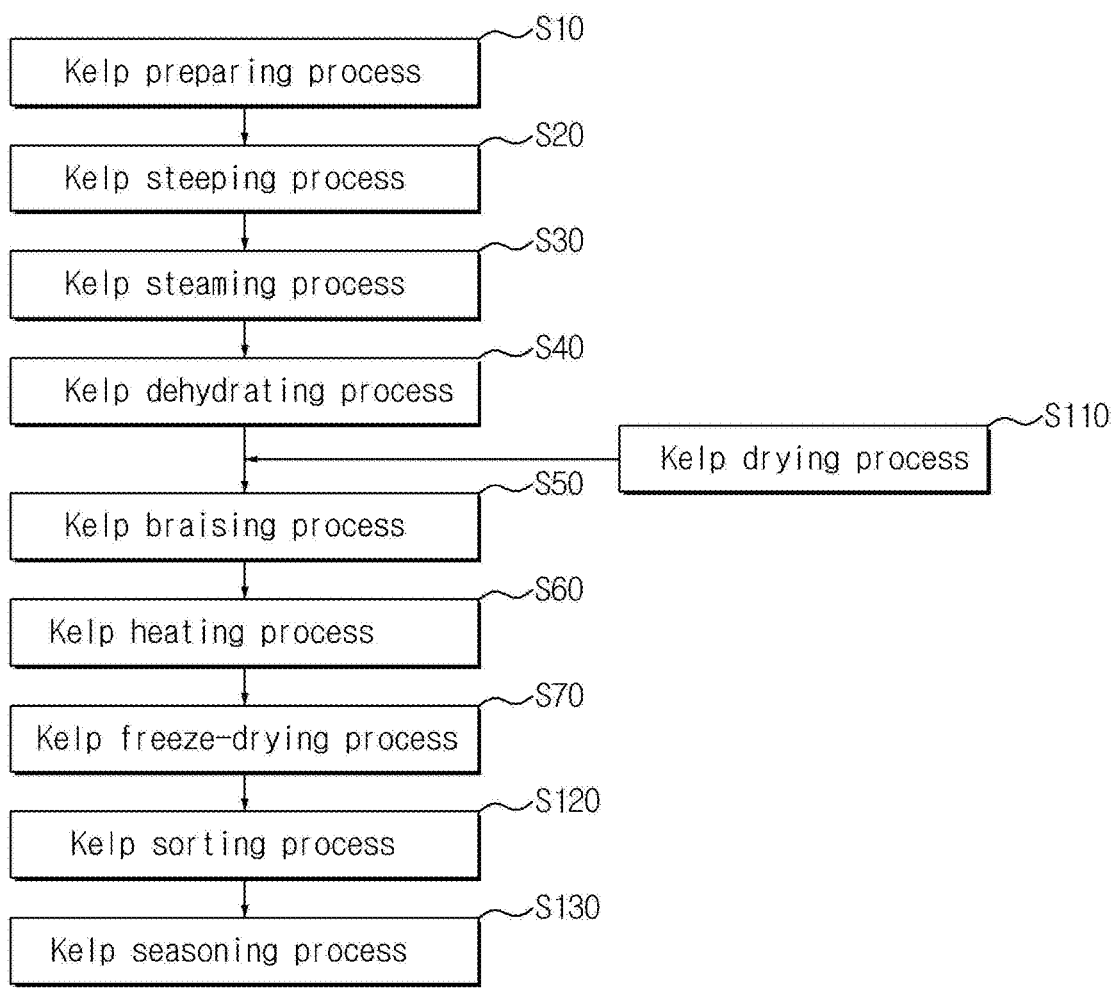
FIG. 2 is a flow chart showing a kelp chip manufacturing process according to another preferred embodiment of the present invention.

Moreover, as shown in FIG. 2, the kelp chip manufacturing method according to the present invention may further include: a kelp drying process (S110) of drying the dehydrated kelp between the kelp dehydrating process (S40) and the kelp braising process (S50); a kelp sorting process (S120) carried out after the kelp freeze-drying process (S70); and a kelp seasoning process (S130).

<Process 8: Kelp Drying Process (Σ110)>

The kelp drying process is to further remove and dry moisture contained in the kelp dehydrated in the kelp dehydrating process. By virtue of the kelp drying process, the constituents used in the kelp braising process can easily permeate into the dried kelp.

<Process 9: Kelp Sorting Process (Σ120)>

In the kelp sorting process, discriminate and sort kelp flakes of good quality from kelp flakes which are broken or imperfectly dried during the kelp freeze-drying process (S70). In this instance, the kelp flakes which are attached to each other are separated and isolated from each other.

<Process 10: Kelp Seasoning Process (Σ130)>

Based on 100 parts by weight of the dried kelp flakes, mix 2 parts by weight of seasoning powder. The seasoning powder mixed with the kelp flakes may improve taste and flavor of the kelp flakes. The seasoning powder may be one of original seasoning powder, pizza seasoning powder, barbecue seasoning powder and garlic seasoning powder.

Embodiment 1

Kelp of good quality is cut into kelp chips with the size of 2 to 3 cm, and as shown in Table 1, kelp chips are manufactured by the following processes.

In the kelp steeping process, soak the kelp chips in a container, and in this instance, the kelp chips of 10 kg are soaked in water of 50 L for 30 to 60 minutes to be steeped.

In the kelp steaming process, steam the kelp chips in boiling water at a temperature of 100 degrees for about 10 minutes.

In the kelp dehydrating process, leave the boiled kelp for about 30 minutes as it is to be dehydrated.

In the kelp braising process, braise the dehydrated kelp in the constituents designated in Table 1 for 50 minutes.

In the kelp heating process, pack the braised kelp chips in a retort pouch, and then, heat the retort-pouched kelp at a temperature of 100 to 120° C. for about 60 minutes.

In the kelp freeze-drying process, spread the kelp chips out on a freeze-drying fan, and the, freeze-dry them at a temperature of −30° C.

TABLE 1

| | Process | | | | | | | | |
|---|---|---|---|---|---|---|---|---|---|
| | | | Braising | | | | | | |
| Name of sample | Steeping | Steaming | Soy source (32 g) | Starch syrup (56 g) | Olive oil (8 g) | Heating | Freeze-drying | Hot-air drying | Low temp. drying |
| Manufacturing example 1 (Original) | X | X | X | X | X | X | X | X | X |

TABLE 1-continued

| | | | Process | | | | | | |
|---|---|---|---|---|---|---|---|---|---|
| | | | Braising | | | | | | |
| Name of sample | Steeping | Steaming | Soy source (32 g) | Starch syrup (56 g) | Olive oil (8 g) | Heating | Freeze-drying | Hot-air drying | Low temp. drying |
| Manufacturing example 2 (after steeping) | ○ | X | X | X | X | X | ○ | X | X |
| Manufacturing example 3 (after steaming) | ○ | ○ | X | X | X | X | ○ | X | X |
| Manufacturing example 4 (after braising 1) | ○ | ○ | ○ | X | X | X | ○ | X | X |
| Manufacturing example 5 (after braising 2) | ○ | ○ | ○ | ○ | X | X | ○ | X | X |
| Manufacturing example 6 (after braising 3) | ○ | ○ | ○ | X | ○ | X | ○ | X | X |
| Manufacturing example 7 (after braising 4) | ○ | ○ | ○ | ○ | ○ | X | ○ | X | X |
| Manufacturing example 8 (after heating) | ○ | ○ | ○ | ○ | ○ | ○ | ○ | X | X |
| Manufacturing example 9 (after hot-air drying) | ○ | ○ | ○ | ○ | ○ | ○ | X | ○ | X |
| Manufacturing example 10 (low temperature drying) | ○ | ○ | ○ | ○ | ○ | ○ | X | X | ○ |

Experimental Example 1

In the embodiment 1, in order to survey texture, such as crispiness, a fishy taste, feeling of irritation, and appearances of the kelp chips manufactured through the above processes, a sensory evaluation was carried out to the panel, and results of the evaluation were measured by the five-point comparison method. Points of the measured texture are indicated in Table 2, points of appearance are indicated in Table 3 and shown in FIG. 3.

* 5: Excellent, 4: good, 3: average, 2: bad, 1: very bad

TABLE 2

| | Crispiness | Reduction of fishy taste | Reduction of feeling of irritation |
|---|---|---|---|
| Manufacturing example 1 (Original) | 1 | 1 | 1 |
| Manufacturing example 2 (after steeping) | 2 | 1 | 1 |
| Manufacturing example 3 (after steaming) | 2 | 1 | 1 |
| Manufacturing example 4 (after braising 1) | 3 | 3 | 2 |
| Manufacturing example 5 (after braising 2) | 3 | 3 | 3 |
| Manufacturing example 6 (after braising 3) | 3 | 3 | 3 |
| Manufacturing example 7 (after braising 4) | 4 | 5 | 5 |
| Manufacturing example 8 (after heating) | 5 | 5 | 5 |
| Manufacturing example 9 (after hot-air drying) | 1 | 4 | 1 |
| Manufacturing example 10 (low temperature drying) | 1 | 4 | 1 |

As you can see from Table 2, compared with the original kelp of the manufacturing example 1, the kelp chips after the steaming process of the manufacturing example 4 was increased in crispiness and was reduced in fishy taste and feeling of irritation. Especially, after the heating process of the manufacturing example 8, the kelp chips were the best in crispiness, had no fishy taste and feeling of irritation, and was the highest in preference.

Moreover, in the case that the finished kelp chips were dried, the kelp chips were reduced in crispiness and were increased in feeling of irritation when the kelp chips were dried by hot air or dried at low temperature.

TABLE 3

| | Appearance |
|---|---|
| Manufacturing example 1 (Original) | White coated state |
| Manufacturing example 2 (after steeping) | White powder (alginic acid) |
| Manufacturing example 3 (after steaming) | White powder (alginic acid) |

TABLE 3-continued

| | Appearance |
|---|---|
| Manufacturing example 4 (after braising 1) | Clean |
| Manufacturing example 5 (after braising 2) | Clean |
| Manufacturing example 6 (after braising 3) | Clean |
| Manufacturing example 7 (after braising 4) | Clean |
| Manufacturing example 8 (after heating) | Clean |
| Manufacturing example 9 (after hot-air drying) | Tangled, Black |
| Manufacturing example 10 (low temperature drying) | Tangled |

Figure 3:
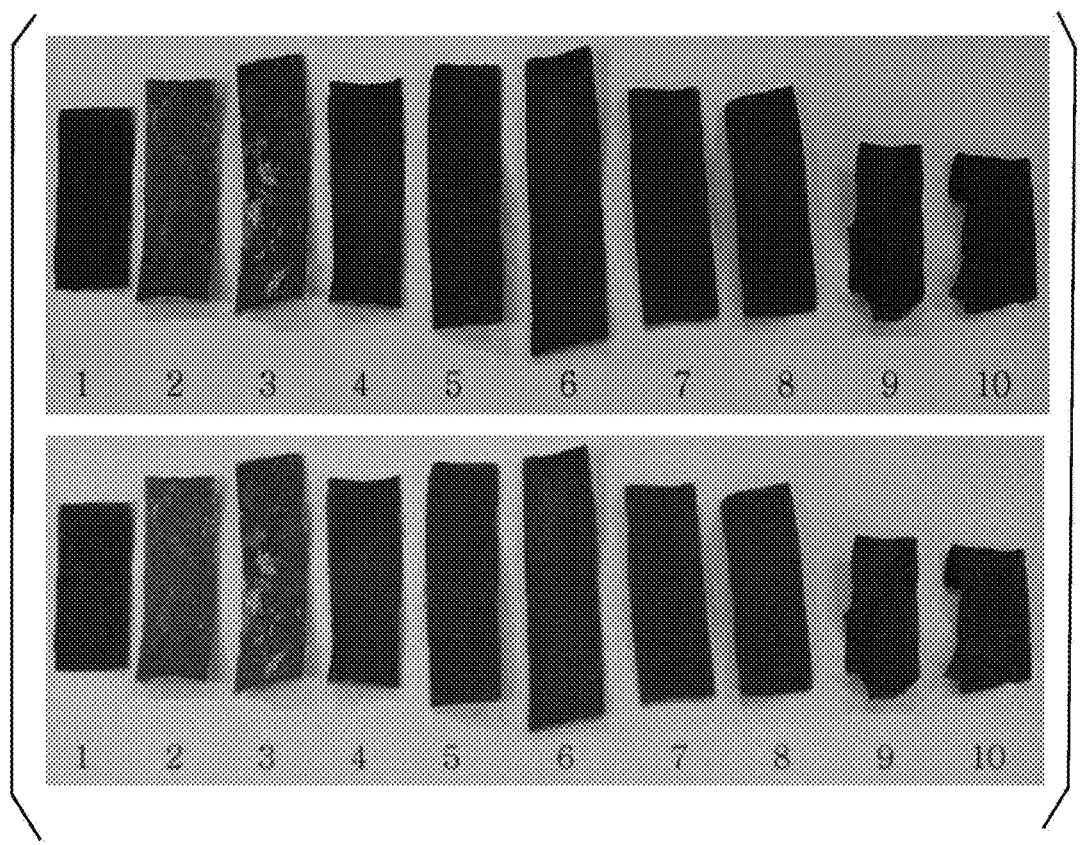
FIG. 3 is a photograph of the outward appearance of kelp chips manufactured by each process according to experimental examples of the present invention.

As you can see from Table 3 and FIG. 3, after the steeping process of the manufacturing example 1, the kelp chips manufactured after the steaming process of the manufacturing example 2 was low in the level of appearance preference because white powder (alginic acid) was smeared on the surfaces of the kelp chips. After the braising process of the manufacturing example 3, the kelp chips became clean in the appearance and was increased in preference. Furthermore, after the heating process of the manufacturing example 8, the kelp chips was the highest in the appearance preference, such as color and cleanness. On the other hand, kelp chips which were manufactured through the hot-air drying process of the manufacturing example 9 and the low temperature drying process of the manufacturing example 10 were turned into black and tangled with one another, and hence, were remarkably decreased in the appearance preference.

Experimental Example 2

In order to measure tissue of the kelp chips manufactured according to the embodiment 1, brittleness was investigated by the return-to-start method using the texture analyzer (TA, XT2i, Stable Micro systems Ltd., England).

TABLE 4

| | 3-point bending test |
|---|---|
| Manufacturing example 1 (Original) | 261.3 |
| Manufacturing example 2 (after steeping) | 402.9 |
| Manufacturing example 3 (after steaming) | 807.6 |
| Manufacturing example 4 (after braising 1) | 709.6 |
| Manufacturing example 5 (after braising 2) | 1330.3 |
| Manufacturing example 6 (after braising 3) | 3274.7 |
| Manufacturing example 7 (after braising 4) | 3624.7 |
| Manufacturing example 8 (after heating) | 5000.3 |
| Manufacturing example 9 (after hot-air drying) | 1233.4 |
| Manufacturing example 10 (low temperature drying) | 1271.5 |

As shown in Table 4, as a result of measurement of brittleness of the kelp chips manufactured by the processes according to the embodiment 1, compared with the original kelp, the degree of brittleness was increased as the processes progressed. In other words, after the heating process of the manufacturing example 8, the degree of brittleness was the maximum value. On the other hand, the kelp chips manufactured not by the freeze-drying process but by the hot-air drying process of the manufacturing example 9 and the low temperature drying process of the manufacturing example 10 were decreased in brittleness. Therefore, it was found that the optimum process for kelp chips was the freeze-drying process after the heating process.

What is claimed is:

1. A kelp chip manufacturing method comprising:
   a kelp preparing process of cutting and preparing kelp;
   a kelp steeping process of steeping the prepared kelp;
   a kelp steaming process of steaming the steeped kelp;
   a kelp dehydrating process of dehydrating the steamed kelp;
   a kelp braising process of braising the dehydrated kelp using one of starch syrup, soy sauce and olive oil or mixture of starch syrup, soy sauce and olive oil;
   a kelp heating process of heating the braised kelp in a retort-pouched state; and
   a kelp freeze-drying process of freeze-drying the heated kelp.

2. The kelp chip manufacturing method according to claim 1, wherein in the kelp braising process, based on 100 parts by weight of the dehydrated kelp, 1 to 30 parts by weight of starch syrup, 1 to 30 parts by weight of soy sauce and 1 to 30 parts by weight of oil are mixed together or 1 to 30 parts by weight of a mixed liquid of starch syrup, soy sauce and oil is added to the dehydrated kelp and braised.

3. The kelp chip manufacturing method according to claim 2, wherein oil is at least one of olive oil, soybean oil, sunflower oil, safflower oil, canola oil, palm oil and sesame seed oil.

4. The kelp chip manufacturing method according to claim 1, wherein the braising process is carried out at a temperature of 30 to 100° C. for 10 to 120 minutes.

5. The kelp chip manufacturing method according to claim 1, wherein the kelp heating process is carried out at a temperature of 70 to 120° C. for 5 to 120 minutes in a state where the kelp is packed in a retort pouch.

6. The kelp chip manufacturing method according to claim 5, wherein in the kelp freeze-drying process, the kelp is freeze-dried at a temperature of −20 to −45° C. for 5 to 120 minutes.

7. The kelp chip manufacturing method according to claim 1, further comprising:
   a kelp drying process of drying the dehydrated kelp between the kelp dehydrating process and the kelp braising process.

8. The kelp chip manufacturing method according to claim 1, further comprising:
   a kelp seasoning process of mixing seasoning powder to the dried kelp after the kelp freeze-drying process.

9. The kelp chip manufacturing method according to claim 8, wherein in the kelp seasoning process, 2 parts by weight of seasoning powder is mixed based on 100 parts by weight of the dried kelp.

* * * * *